United States Patent
Furuta et al.

(10) Patent No.: US 6,463,491 B1
(45) Date of Patent: Oct. 8, 2002

(54) DATA TRANSFER MAKING EFFICIENT USE OF TIME CONCERNING BUS ARBITRATION

(75) Inventors: Masayuki Furuta; Kouki Shigaki; Chikara Shibagaki, all of Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/334,794

(22) Filed: Jun. 16, 1999

(30) Foreign Application Priority Data

Dec. 18, 1998 (JP) .......................................... 10-361617

(51) Int. Cl.[7] ................................................ G06F 1/00
(52) U.S. Cl. ...................... 710/240; 710/306; 710/308; 710/309; 710/310; 710/118; 709/202; 709/217
(58) Field of Search ................................ 710/240, 241, 710/242, 243, 220, 107, 112–114, 119–120, 124, 58, 61, 305, 306, 308, 310, 309, 110, 117, 118; 709/201–203, 211, 213, 217, 218, 219, 229, 231–232, 250, 245, 244

(56) References Cited

U.S. PATENT DOCUMENTS 4,471,425 A * 9/1984 Yamaguchi et al. ........ 710/100
5,276,807 A * 1/1994 Kodama et al. ............ 709/200
5,493,651 A * 2/1996 Crouse et al. .............. 709/202
5,539,915 A * 7/1996 Burton et al. ................ 710/21
5,809,261 A * 9/1998 Lambrecht .................. 710/306
5,850,528 A * 12/1998 Walton et al. .............. 710/107
6,098,115 A * 8/2000 Eberhard et al. ............. 710/7
6,230,229 B1 * 5/2001 Van Krevelen et al. ..... 710/316
6,260,099 B1 * 7/2001 Gilbertson et al. ......... 710/240

FOREIGN PATENT DOCUMENTS

JP            56-105520           8/1981

* cited by examiner

Primary Examiner—Peter Wong
Assistant Examiner—Raymond N Phan
(74) Attorney, Agent, or Firm—Katten Muchin Zavis Roseman

(57) ABSTRACT

A method of transferring data from a source device to a destination device via a source-control device connected to the source device and a destination-control device connected to the destination device includes the steps of transmitting a data-transfer-request signal from the source device to the source-control device, transmitting a data-transfer-acknowledge signal from the source-control device to the source device in response to the data-transfer-request signal, and transmitting a data-transfer-request signal from the source-control device to the destination-control device concurrently with the transmission of the data-transfer-acknowledge signal.

11 Claims, 15 Drawing Sheets

F I G. 1 1
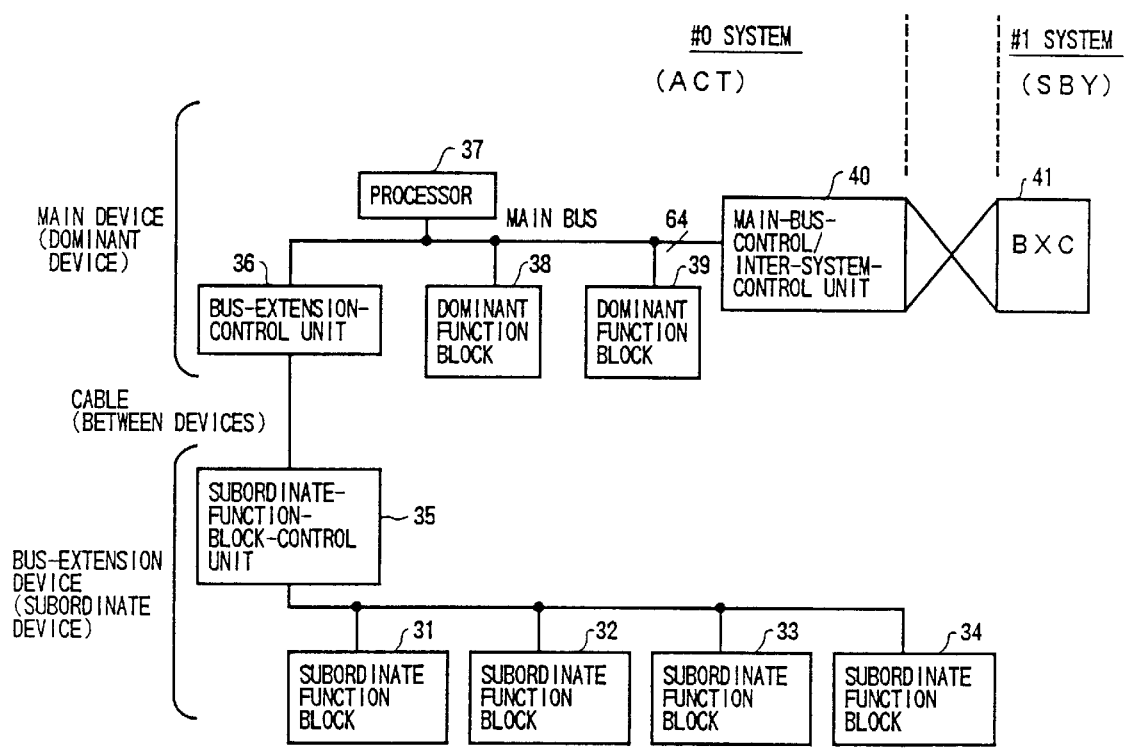

F I G. 1 2
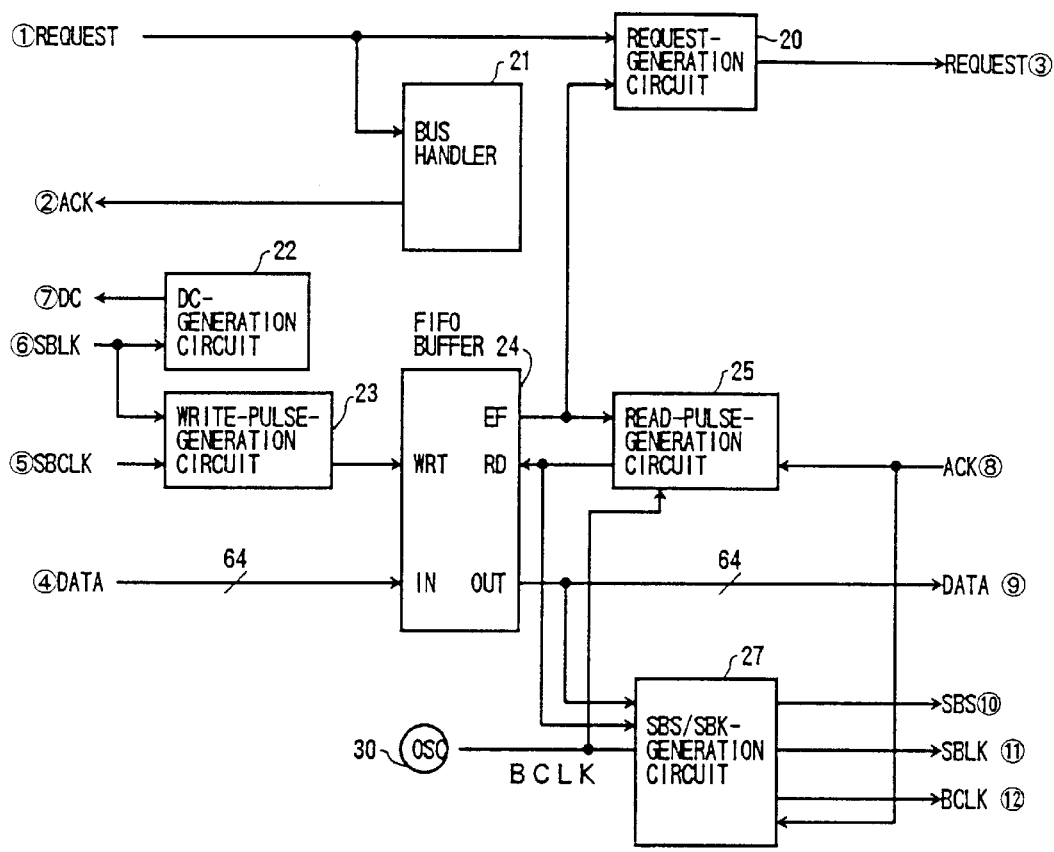

F I G. 1 3
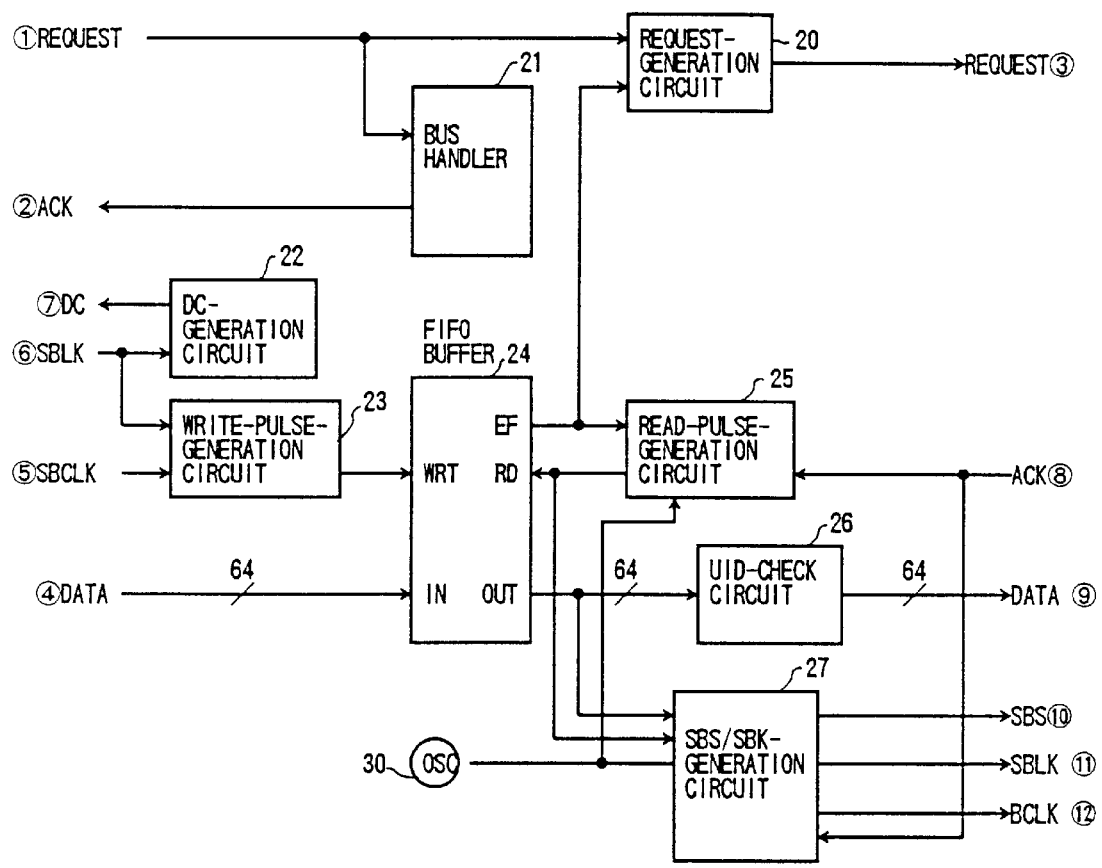

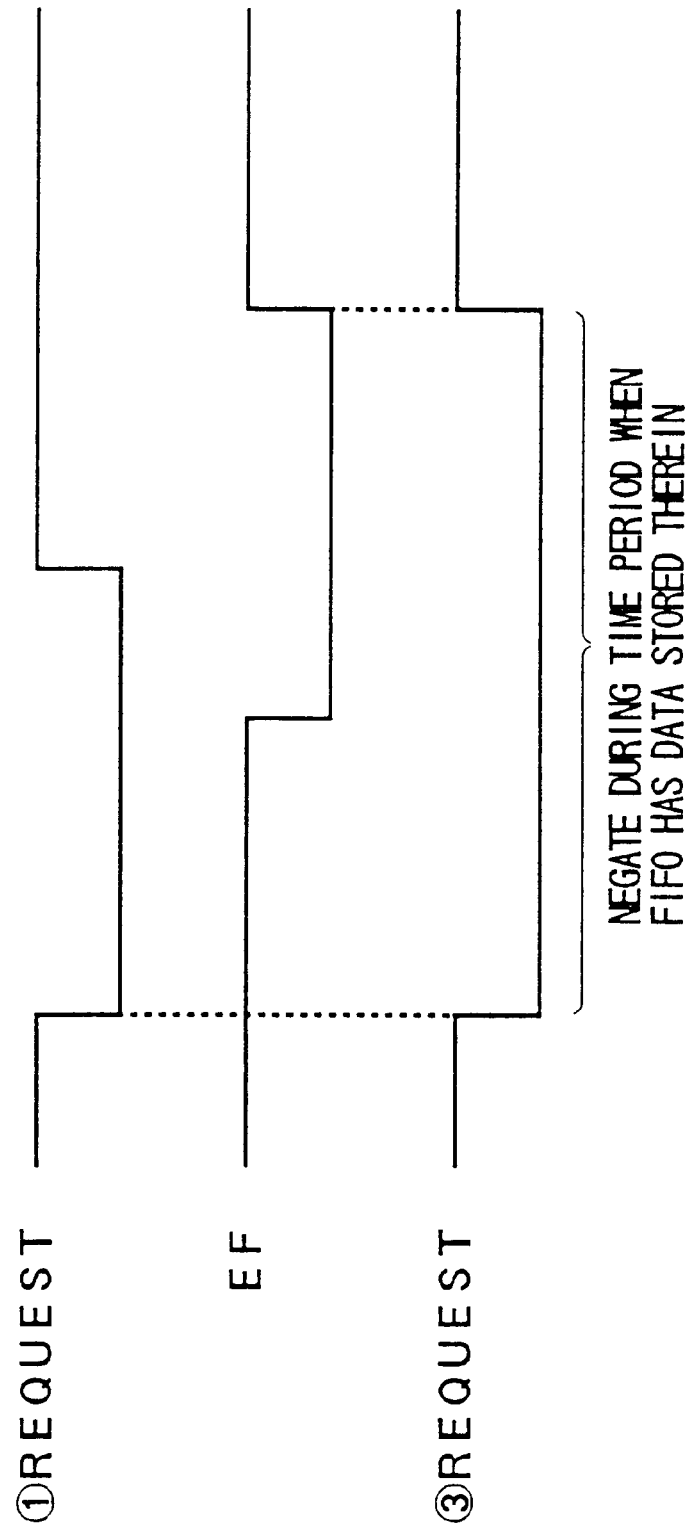

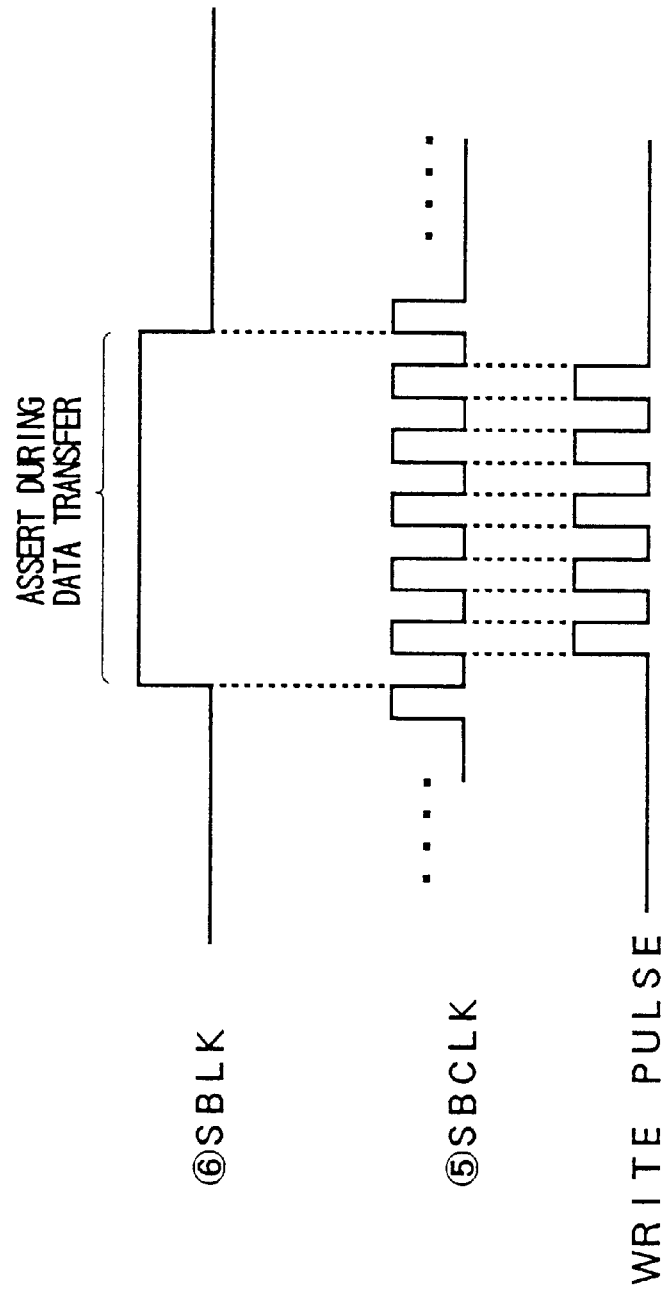

DATA TRANSFER MAKING EFFICIENT USE OF TIME CONCERNING BUS ARBITRATION

BACKGROUND OF THE INVENTION

1. Field of the Invention

The present invention generally relates to methods of data transfer and devices for controlling data transfer, and particularly relates to a method of data transfer and a device for controlling data transfer based on the method of data transfer.

2. Description of the Related Art

A size of switch systems used in communication networks has been on the increase in recent years in order to meet an increasing demand for various types of different communication means such as cellular phones, PHS (personal handyphone systems), ISDN (integrated services digital network), etc.

FIG. 1 is a block diagram showing a typical configuration employed in inter-device communications as employed in switch systems. FIG. 2 is an illustrative drawing showing a physical appearance of the devices of FIG. 1.

A dominant device 12 is connected to a subordinate device 11 via a cable 13. The dominant device 12 holds a dominant position in comparison with the subordinate device 11 in that the dominant device 12 can use a bus anytime at its own request, for example. On the other hand, the subordinate device 11 needs to submit itself to bus arbitration in order to use the bus. The cable 13 may be a single signal line, or may be a plurality of signal lines. Each signal line may be a simple line structure, or may be a combined line structure.

In what follows, the configuration of inter-device communication will be described with reference to FIG. 1.

The dominant device 12 includes a plurality of interface-control units 7 and 8 and a plurality of dominant function blocks 9 and 10. Function blocks are such units as processors and input/output devices. The dominant function block 10 is a switch device itself, and the dominant function block 10 is an input/output device.

The subordinate device 11 includes a plurality of interface-control units 5 and 6 and a plurality of subordinate function blocks 1 through 4. The subordinate function blocks 1 through 4 are input/output devices, for example.

The interface-control units 7 and 8 and the dominant function blocks 9 and 10 of the dominant device 12 communicate with each other via a dominant bus 14. The interface-control units 5 and 6 and the subordinate function blocks 1 through 4 communicate with each other via subordinate buses 17 and 18.

Communication between the dominant device 12 and the subordinate device 11 is conducted via the interface-control units. When the dominant function block 10 needs to communicate with the subordinate function block 1, an order issued from the dominant function block 10 is transferred to the subordinate function block 1 via the dominant bus 14, the interface-control unit 7, a communication line 15, the interface-control unit 5, and the subordinate bus 18. An answer to this order is transferred from the subordinate function block 1 to the dominant function block 10 by traveling along the same route in an opposite direction.

In general, communication between the dominant device 12 and the subordinate device 11 is conducted in such a manner as to provide priority to the dominant device 12. Namely, when the dominant device 12 accesses the subordinate device 11, there is no need for bus arbitration. On the other hand, when the subordinate device 11 accesses the dominant device 12, the subordinate device 11 needs to ask for bus arbitration. Since the subordinate device 11 cannot access the dominant device 12 without going through bus arbitration, such an access may take time due to a lengthy arbitration process, thereby hampering an attempt to enhance communication speed.

FIG. 3 is a sequence chart showing a sequence performed when the subordinate function block 1 accesses the dominant function block 10.

[1] The subordinate function block 1 sends a signal REQ (request for use of a bus) to the interface-control unit 5.

[2] Upon receiving the signal REQ, the interface-control unit 5 returns a signal ACK for acknowledging use of the bus to the subordinate function block 1 that sent the signal REQ. This grants the right to use the bus.

[3] Upon receiving the signal ACK, the subordinate function block 1 starts transmitting data DATA to the interface-control unit 5.

[4] The interface-control unit 5 stores the received data DATA in a buffer Buffer#1 thereof. After storing all the data DATA in the buffer Buffer#1, the interface-control unit 5 transmits a signal REQ to the interface-control unit 7 in order to request use of a bus between the devices.

[4]–[6] A bus arbitration as shown in [1]–[3] described above is conducted between the devices (i.e., between the interface-control unit 5 and the interface-control unit 7). The interface-control unit 7 stores the data DATA in a buffer Buffer#2 thereof. After storing all the data DATA in the buffer Buffer#2, the interface-control unit 7 transmits a signal REQ to the dominant function block 10.

[7]–[9] A bus arbitration as in [1]–[3] described above is performed within the dominant device 12 (i.e., between the interface-control unit 7 and the dominant function block 10). Then, the data DATA is transferred to the dominant function block 10, and the signal REQ is withdrawn after completion of the data transfer. This completes data transfer between the devices.

In the related-art, the subordinate device accesses the dominant device, and transfers data as shown in the sequence described above.

As shown in the above, when the subordinate device accesses the dominant device in the inter-device communication, first, a bus arbitration takes place within the subordinate device as in [1], [2], [3] of FIG. 3. Then, a next bus arbitration is conducted between the devices as in [4], [5], [6] of FIG. 3. Finally, another bus arbitration is held within the dominant device as in [7], [8], [9] of FIG. 3.

As shown FIG. 3, the subordinate device first stores all the data in the buffer thereof, and, then, transmits a signal REQ to the dominant device in order to minimize a period of exclusive use of the bus connected to the dominant device and to insure that all the data is transferred correctly.

In general, access from the subordinate device to the dominant device is made in form of an answer, which is issued in response to an order sent from the dominant device. As the system is expanded, the number of subordinate function blocks is increased in the subordinate device, so that access from the dominant device to the subordinate device is increased accordingly.

Since every one of the subordinate function blocks needs to return an answer in response to an access from the dominant device, the number of accesses becomes more frequent that when the dominant device is connected to only one subordinate function block.

As a result, as the system is more expanded, the number of bus arbitrations increases in association with returned answers. This leads to an undesirable fall in a response time.

Accordingly, there is a need for a scheme which can enhance data-transfer speed between devices as in between a subordinate device and a dominant device.

SUMMARY OF THE INVENTION

Accordingly, it is a general object of the present invention to provide a scheme which can satisfy the need described above.

It is another and more specific object of the present invention to provide a scheme which can enhance data-transfer speed between devices as in between a subordinate device and a dominant device.

A method of transferring data from a source device to a destination device via a source-control device connected to the source device and a destination-control device connected to the destination device includes the steps of transmitting a data-transfer-request signal from the source device to the source-control device, transmitting a data-transfer-acknowledge signal from the source-control device to the source device in response to the data-transfer-request signal, and transmitting a data-transfer-request signal from the source-control device to the destination-control device concurrently with the transmission of the data-transfer-acknowledge signal.

In the method described above, a time period during which data is transferred from the source device (subordinate function block) and stored in a buffer of the source-control device (interface-control unit) is utilized to make efficient use of time. Namely, a bus arbitration with the destination-control device (dominant device) is not commenced after all the transferred data is stored in the buffer, but is started and completed while the transferred data is being stored in the buffer. This is achieved by transmitting the data-transfer-request signal to the destination-control device concurrently with the transmission of the data-transfer-acknowledge signal. In this manner, access to the destination-control device is established while the buffer accumulates the data. This can shorten a time length required for data transfer by virtually eliminating a time period for a bus arbitration.

Other objects and further features of the present invention will be apparent from the following detailed description when read in conjunction with the accompanying drawings.

BRIEF DESCRIPTION OF THE DRAWINGS

FIG. 11 is a block diagram showing a configuration of a system having a bus extension device and a main device;

FIG. 12 is a block diagram of a subordinate-function-block-control unit;

FIG. 13 is a block diagram of a bus-extension-control unit;

FIG. 14 is a timing chart for explaining generation of a REQUEST signal; and

FIG. 15 is a timing chart showing how to generate a WRITE-pulse signal.

DESCRIPTION OF THE PREFERRED EMBODIMENTS

In the following, a principle and embodiments of the present invention will be described with reference to the accompanying drawings.

1 First Embodiment

In a first embodiment, a signal ACK for acknowledging use of a bus is transmitted to a subordinate function block that is under control of a interface-control unit of a subordinate device, thereby requesting transfer of data. Concurrently, a signal REQ for requesting use of a bus is transmitted to a dominant device in order to request use of a bus for transferring data to the dominant device, thereby having a bus-acquisition process concurrently underway.

In the related art, all the data is stored first before the right to use a dominant bus is requested. In the first embodiment, however, the interface-control unit of the subordinate device makes an attempt to acquire the right to use the dominant bus before receiving all the data to be transmitted.

In the following, the first embodiment will be described.

In the first embodiment, a time period during which data is transferred from a subordinate function block and stored in a buffer of an interface-control unit of a subordinate device is utilized to make efficient use of time. Namely, a bus arbitration with a dominant device is not commenced after all the transferred data is stored in the buffer, but is started and completed while the transferred data is being stored in the buffer. This makes sure that the transferred data is ready to be transmitted to the dominant device by the time all the data is accumulated in the buffer. In this manner, access to the dominant device is established while the buffer accumulates the data. This can shorten a time length required for data transfer by virtually eliminating a time period for a bus arbitration.

Figure 5:
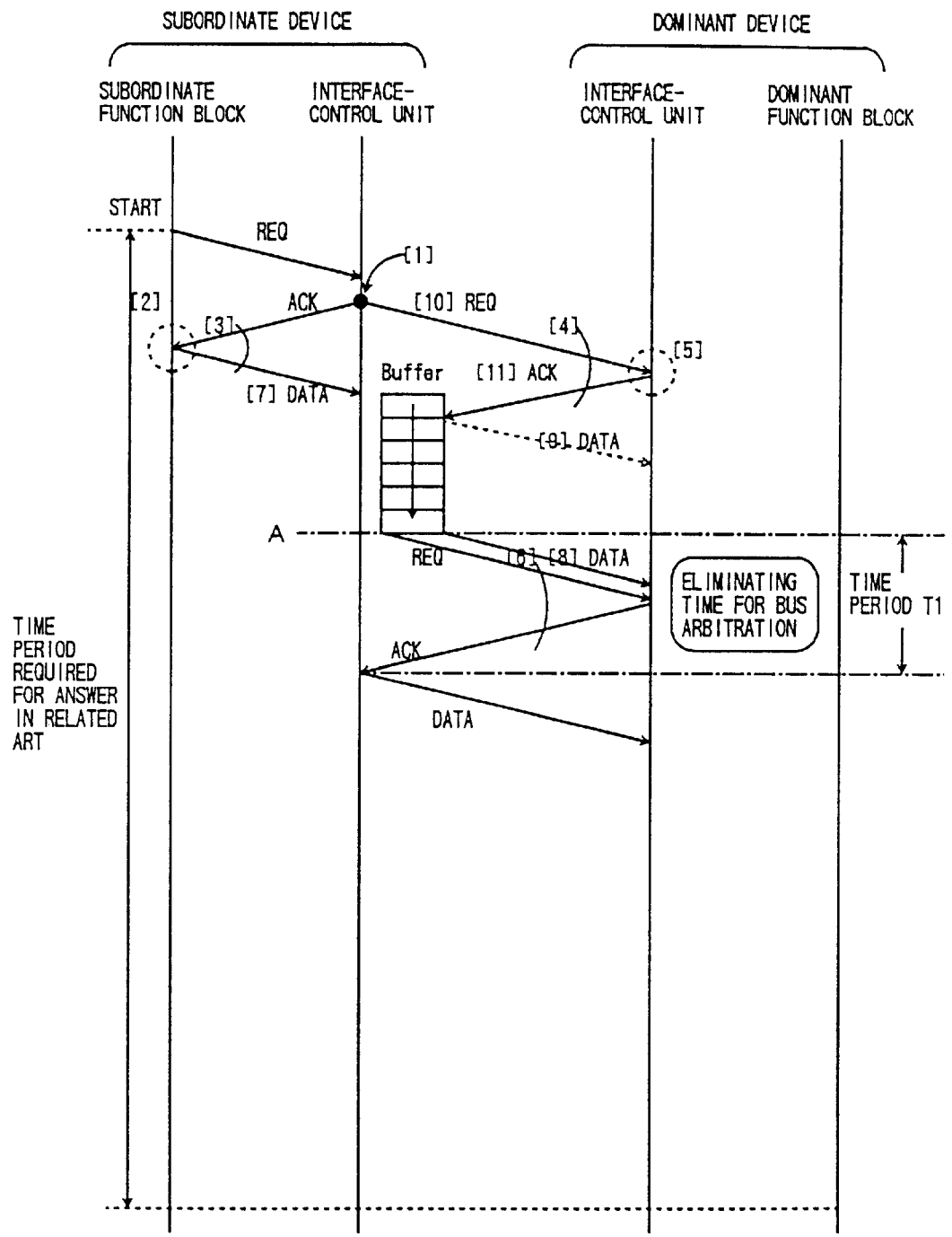
FIG. 5 is a sequence chart for explaining a reduction of time according to a first embodiment of the present invention.

FIG. 5 is a sequence chart for explaining a reduction of time according to the first embodiment of the present invention.

In FIG. 5, as an access operation [3], an interface-control unit of a subordinate device returns a signal ACK to a subordinate function block in response to a signal REQ sent from the subordinate function block. The subordinate function block starts transmitting data immediately after receiving the signal ACK (operation [2] in the figure).

As an access operation [4], the interface-control unit of the subordinate device sends a signal REQ to an interface-control unit of a dominant device. In response, the interface-control unit of the dominant device immediately returns a signal ACK to the interface-control unit of the subordinate device (operation [5] in the figure).

When the access operation [3] is compared with the access operation [4], the access operation [4] takes a longer time period than the access operation [3] because the access operation [4] involves inter-device communications. When the access operation [3] with respect to the subordinate function block and the access operation [4] with respect to the dominant device are simultaneously started at a point of time [1] as shown in FIG. 5, the interface-control unit of the subordinate device starts storing in the buffer thereof the data sent from the subordinate function block before the signal ACK is returned from the dominant device. Because of this, the interface-control unit of the subordinate device can start transmitting data to the dominant device right after all the data sent from the subordinate function block is stored in the buffer.

In the related art, the interface-control unit of the subordinate device starts accessing the dominant device (operation [6] in the figure) at a timing A when all the data from the subordinate function block is stored in the buffer of the interface-control unit of the subordinate device.

In the first embodiment, on the other hand, transmission of data to the dominant device can be started at the timing A when all the data from the subordinate function block is stored in the buffer of the interface-control unit of the subordinate device. This configuration eliminates a time period Ti which would be required for a bus arbitration if the bus arbitration started at the timing A. Accordingly, a total time period is shortened by such a time length as would be required by a bus arbitration process conducted between the subordinate device and the dominant device.

Figure 6:
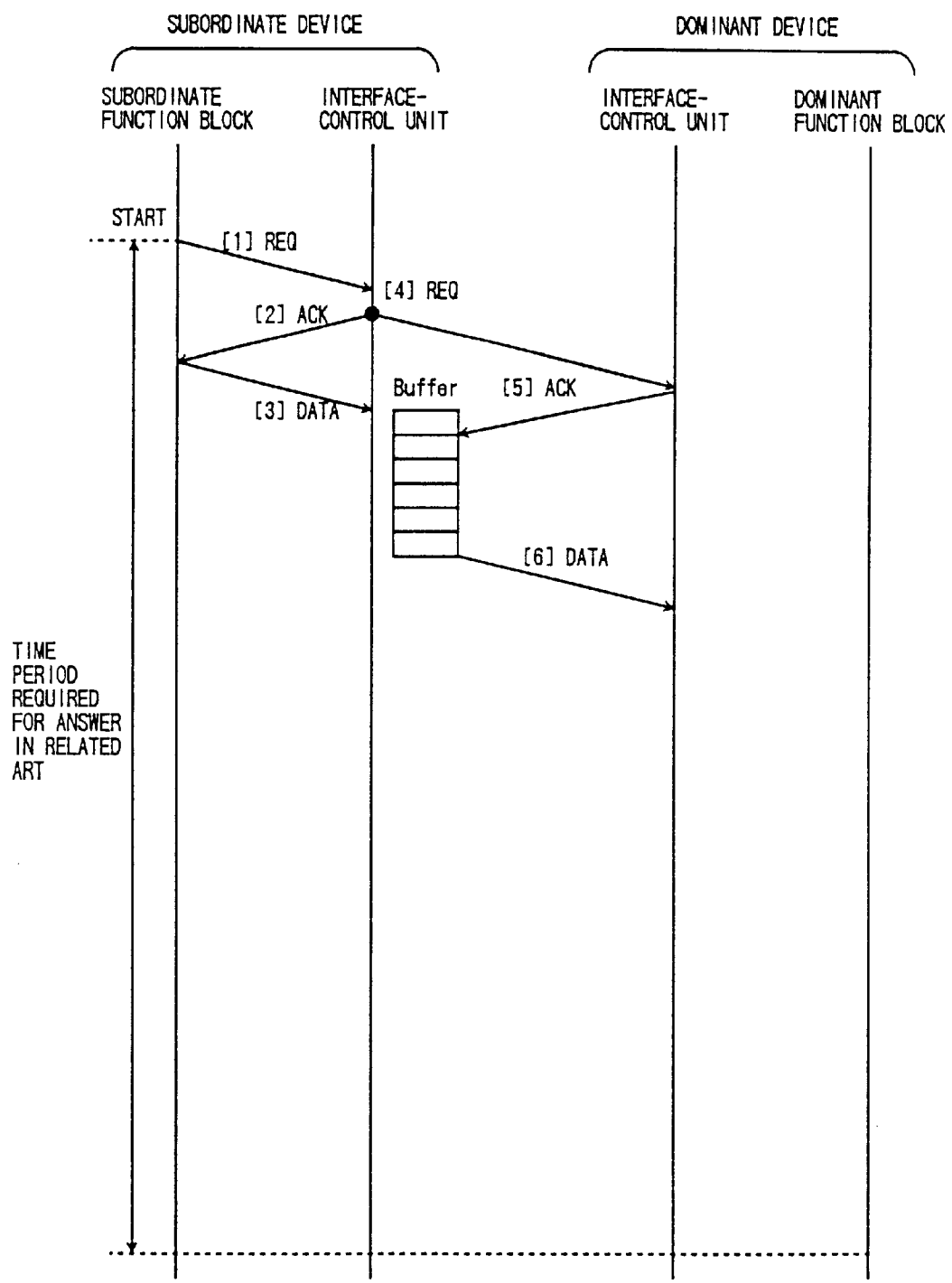
FIG. 6 is a sequence chart showing a sequence of operations which are performed according to the first embodiment of the present invention.

FIG. 6 is a sequence chart showing a sequence of operations which are performed according to the first embodiment of the present invention.

[1] The subordinate function block sends the signal REQ to the interface-control unit.

[2] Upon receiving the signal REQ, the interface-control unit returns the signal ACK for acknowledging use of a bus to the subordinate function block, thereby granting the right to use the bus.

[4] At the same time as the operation [2], the interface-control unit sends the signal REQ to the interface-control unit of the dominant device.

[3] Upon receiving the signal ACK, the subordinate function block starts transferring data DATA to the interface-control unit of the subordinate device.

[5] Upon receiving the signal REQ, the interface-control unit of the dominant device returns the signal ACK for acknowledging use of a bus to the interface-control unit of the subordinate device, thereby granting the right to use the bus.

[6] Having stored all the data sent from the subordinate function block in the buffer, the interface-control unit of the subordinate device transmits the data DATA stored in the buffer to the interface-control unit of the dominant device.

2 Second Embodiment

A second embodiment uses a FIFO (first in first out) buffer as a data-storage buffer in order to reduce a transfer time.

Figure 7:
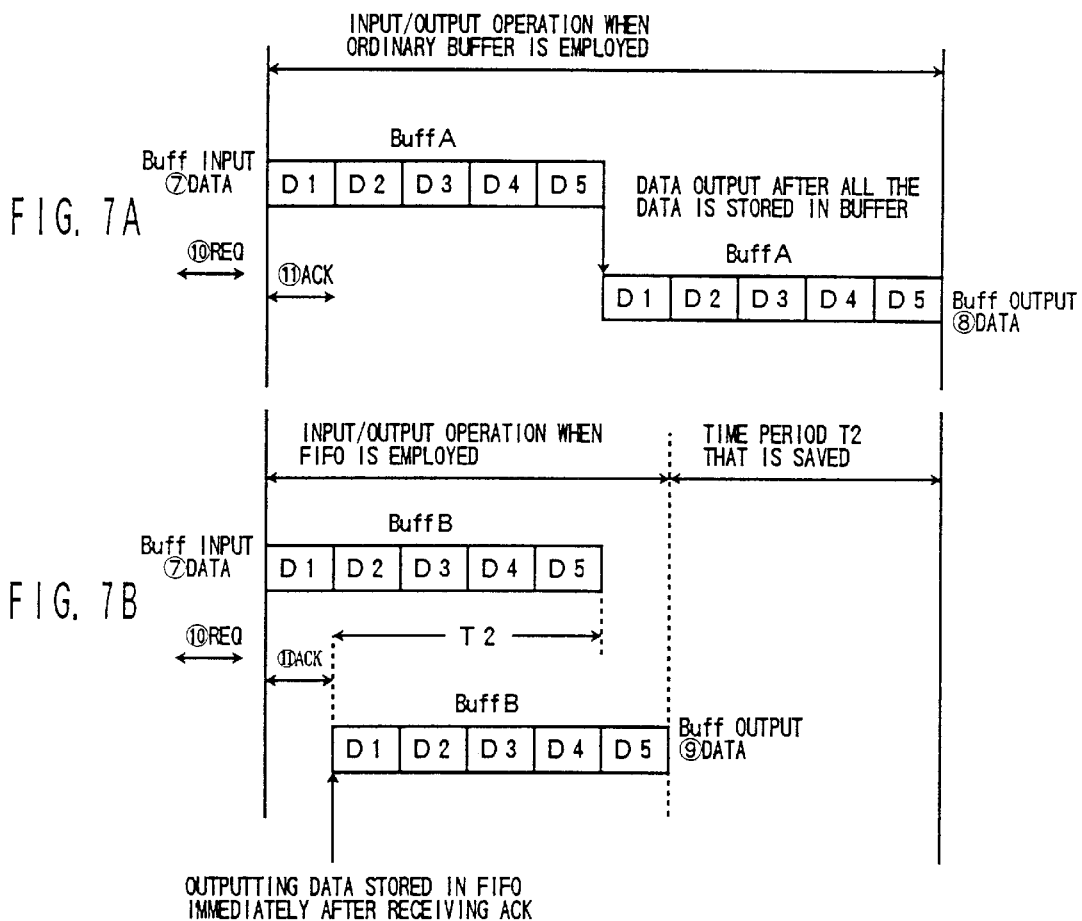
FIGS. 7A and 7B are illustrative drawings for explaining a second embodiment in comparison with the first embodiment.

FIGS. 7A and 7B are illustrative drawings for explaining the second embodiment in comparison with the first embodiment.

FIG. 7A shows the way data is transferred in the first embodiment. In FIG. 7A, numbers in brackets "[" and "]" indicate access operations having the same numbers in FIG. 5. In the first embodiment having a conventional buffer BuffA, data transfer is commenced only after all the transfer data is stored in the buffer BuffA. Namely, even though the signal ACK for granting use of the bus for data transfer is received ([11]), data transfer needs to wait until all the transfer data is stored in the buffer BuffA.

As shown in FIG. 7B, according to the second embodiment, use of a buffer BuffB of a FIFO type makes it possible to transfer data as soon as the signal ACK is received. This saves a time period T2 which would otherwise pass from receipt of the signal ACK for granting use of the bus to completion of a process storing all the data in the buffer BuffB.

Figure 8:
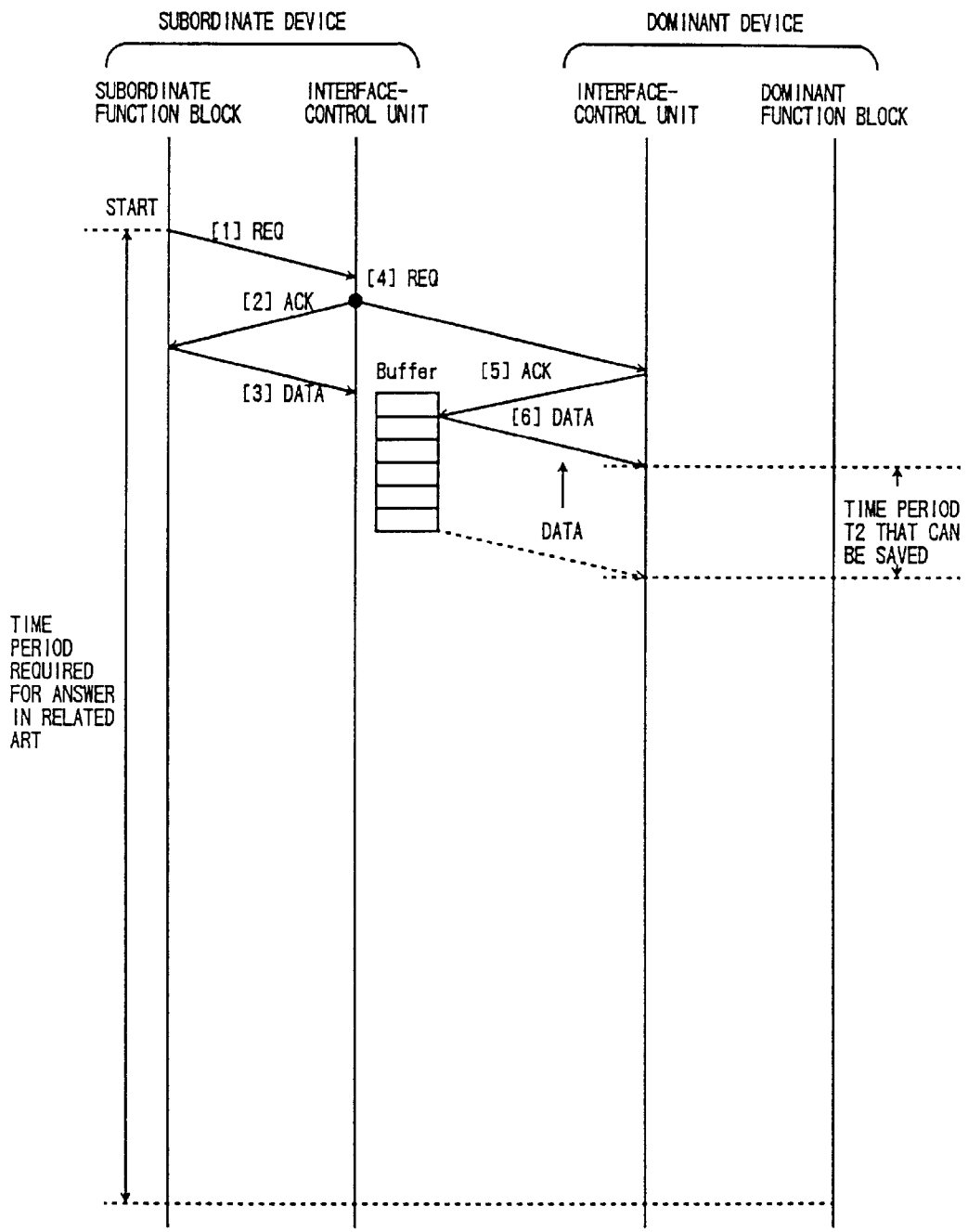
FIG. 8 is a sequence chart showing a sequence of operations which are performed according to the second embodiment of the present invention.

FIG. 8 is a sequence chart showing a sequence of operations which are performed according to the second embodiment of the present invention.

[1] The subordinate function block sends a signal REQ to the interface-control unit.

[2] Upon receiving the signal REQ, the interface-control unit returns the signal ACK for acknowledging use of a bus to the subordinate function block, thereby granting the right to use the bus.

[4] At the same time as the operation [2], the interface-control unit sends a signal REQ to the interface-control unit of the dominant device.

[3] Upon receiving the signal ACK, the subordinate function block starts transferring data DATA to the interface-control unit of the subordinate device.

[5] Upon receiving the signal REQ, the interface-control unit of the dominant device returns a signal ACK for acknowledging use of a bus to the interface-control unit of the subordinate device, thereby granting the right to use the bus.

[6] While storing the data DATA sent from the subordinate function block in a buffer thereof, the interface-control unit of the subordinate device transmits the data DATA stored in the buffer to the interface-control unit of the dominant device after receiving the signal ACK from the interface-control unit of the dominant device.

In FIG. 8, the interface-control unit of the subordinate device returns the signal ACK to the subordinate function block in response to the signal REQ sent therefrom, and, at the same time, sends the signal REQ to the interface-control unit of the dominant device. The second embodiment is not limited to this configuration, and does not have to have simultaneous transmissions of the signal ACK to the subordinate function block and the signal REQ to the interface-control unit of the dominant device.

3 Third Embodiment

Figure 9:
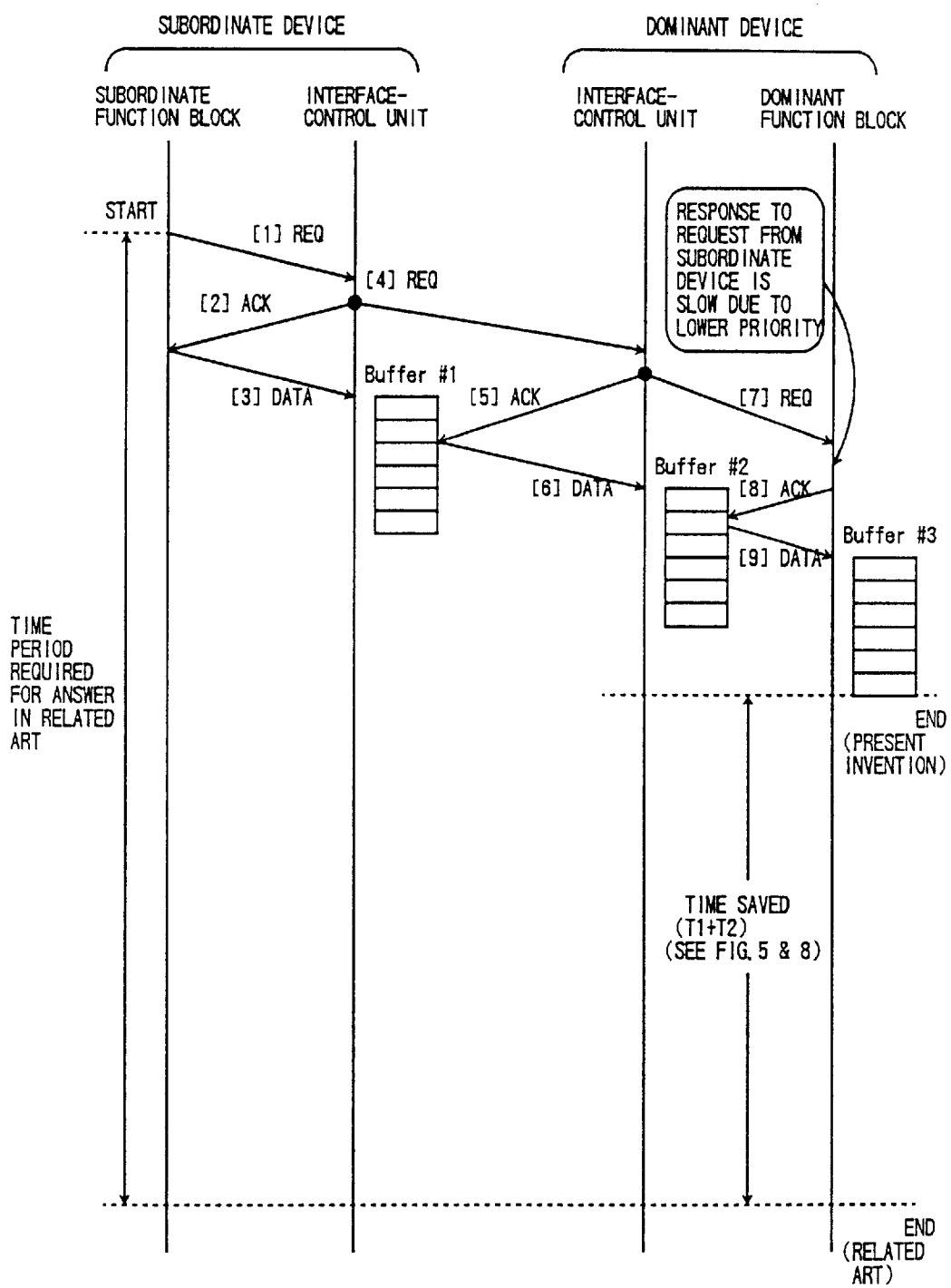
FIG. 9 is a sequence chart showing a sequence of operations which are performed according to a third embodiment of the present invention.

FIG. 9 is a sequence chart showing a sequence of operations which are performed according to a third embodiment of the present invention.

In the third embodiment, the procedure performed between the interface-control unit of the subordinate device and the interface-control unit of the dominant device is also applied between the interface-control unit of the dominant device and a dominant function block. Since the sequence chart of FIG. 9 merely adds the substantially same procedure as that described in connection with FIG. 8 as a procedure between the interface-control unit of the dominant device and the dominant function block, no further description will be provided with regard to details of each operations.

It should be noted, however, that the dominant function block does not return a signal ACK immediately after receiving a signal REQ from the interface-control unit of the dominant device. This is because this request originates from the subordinate device, and, thus, is given lower priority. As a result, a response time to send the signal ACK is not so quick in this case.

In the third embodiment, a time required for a bus arbitration as well as a time needed for storage of all the transfer data in a buffer can be saved. In the related-art configuration, system expansion adding subordinate function blocks results in an increase in a response time. In the third embodiment, on the other hand, the more the system is expanded, the more prominent the effect of a time reduction. In this manner, data transfer between the devices can be conducted at a faster speed.

In a configuration in which a large number of subordinate function blocks are added, bus arbitration needs to be conducted at an increased frequency as each of the subordinate function blocks needs to answer to the dominant device. In such a configuration, a time reduction achieved with respect to each access can bring about significant saving of time for the system as a whole.

Further, since the third embodiment can achieve a faster response of the subordinate function blocks, the dominant function block can attend to a next process more quickly. This results in a significant enhancement of a processing speed for the system as a whole.

Figure 10A:
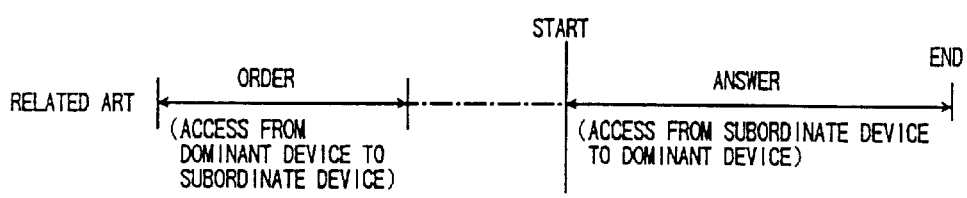
FIGS. 10A and 10B are illustrative drawings for explaining how a dominant device can attend to a next process more quickly when an answer is provided at an earlier timing.
Figure 10B:
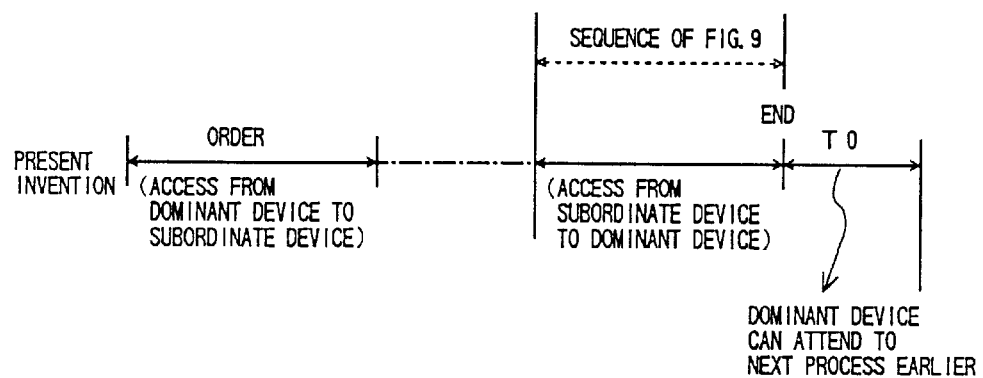

FIGS. 10A and 10B are illustrative drawings for explaining how the dominant device can attend to a next process more quickly when an answer is provided at an earlier timing.

FIG. 10A shows a case in which the related-art configuration is used, and FIG. 10B shows a case in which the configuration of the third embodiment is used. As shown in the figures, the third embodiment can save time by a time period T0 in comparison with the related-art configuration when the dominant device issues an order, and the subordinate device answers to that order. Because of this, the dominant device of the third embodiment can attend to the next process earlier than the dominant device of the related-art configuration.

It should be noted that the advantages identified above are also characteristics of the first and second embodiments.

In the following, a detailed configuration will be described with regard to a system in which communications are conducted between a bus extension device (subordinate device) and a main device (dominant device).

FIG. 11 is a block diagram showing a configuration of a system having a bus extension device and a main device.

Figure 1:
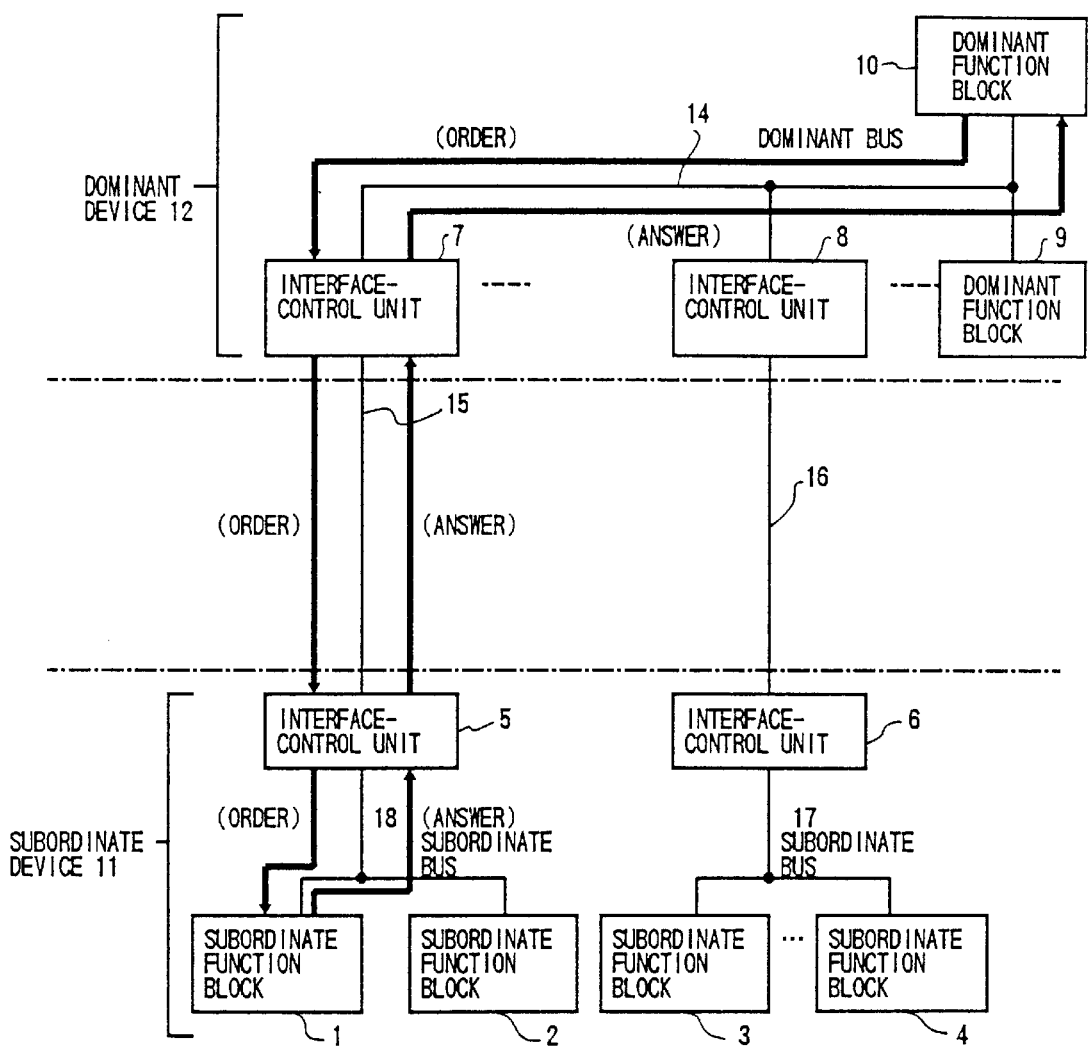
FIG. 1 is a block diagram showing a typical configuration employed in inter-device communications as employed in switch systems.
Figure 2:
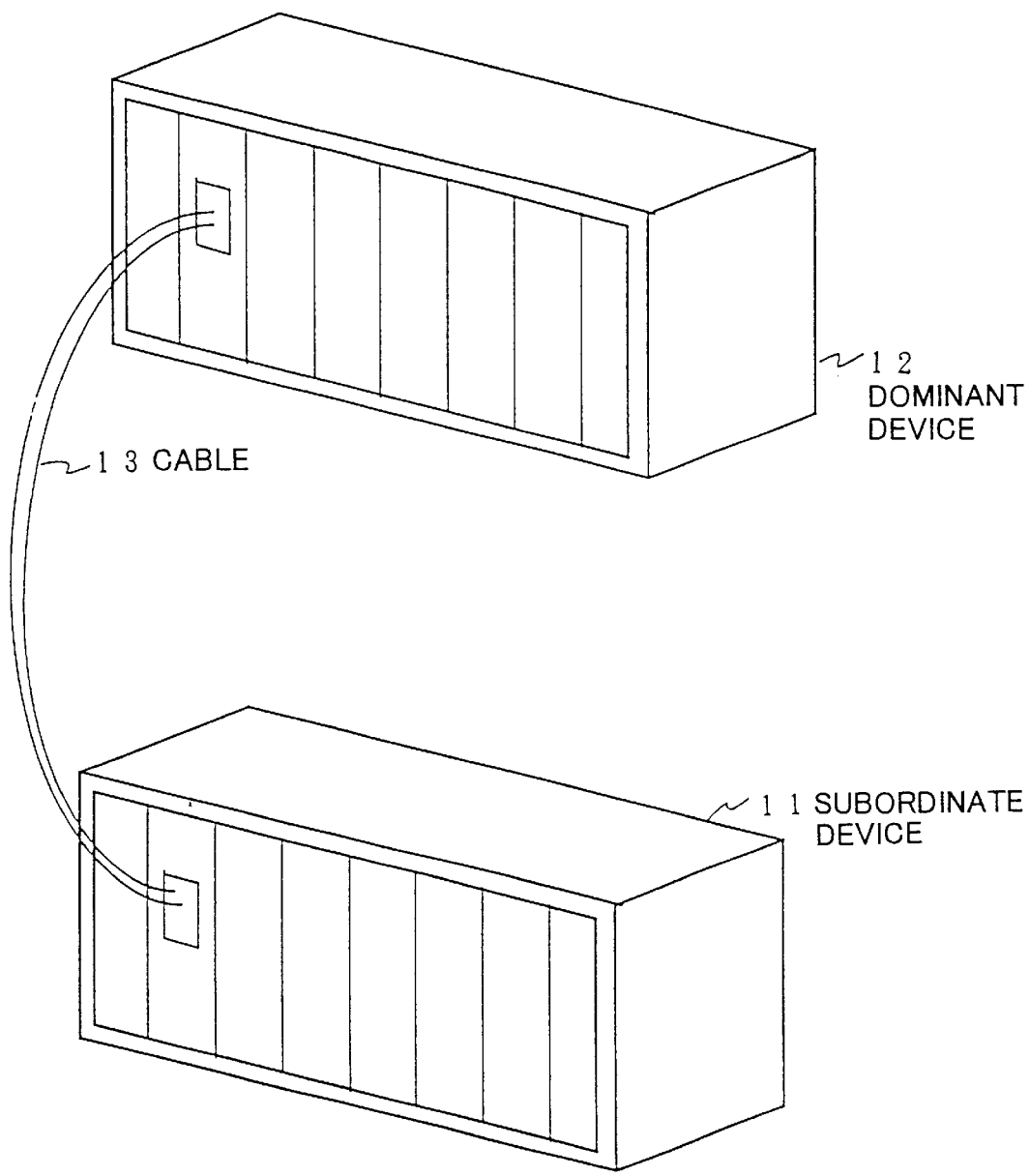
FIG. 2 is an illustrative drawing showing a physical appearance of the devices of FIG. 1.
Figure 3:
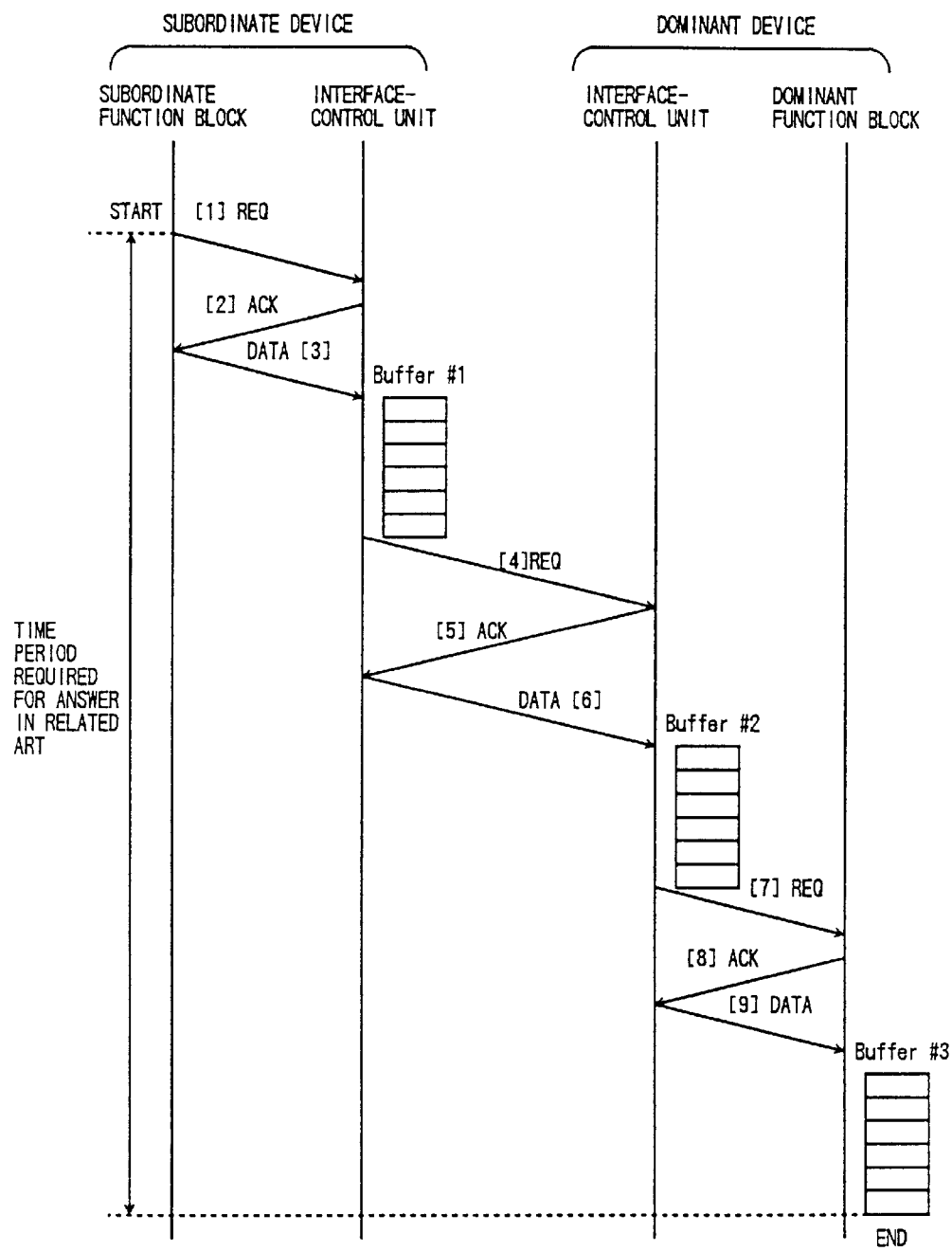
FIG. 3 is a sequence chart showing a sequence performed when a subordinate function block accesses a dominant function block.
Figure 4:
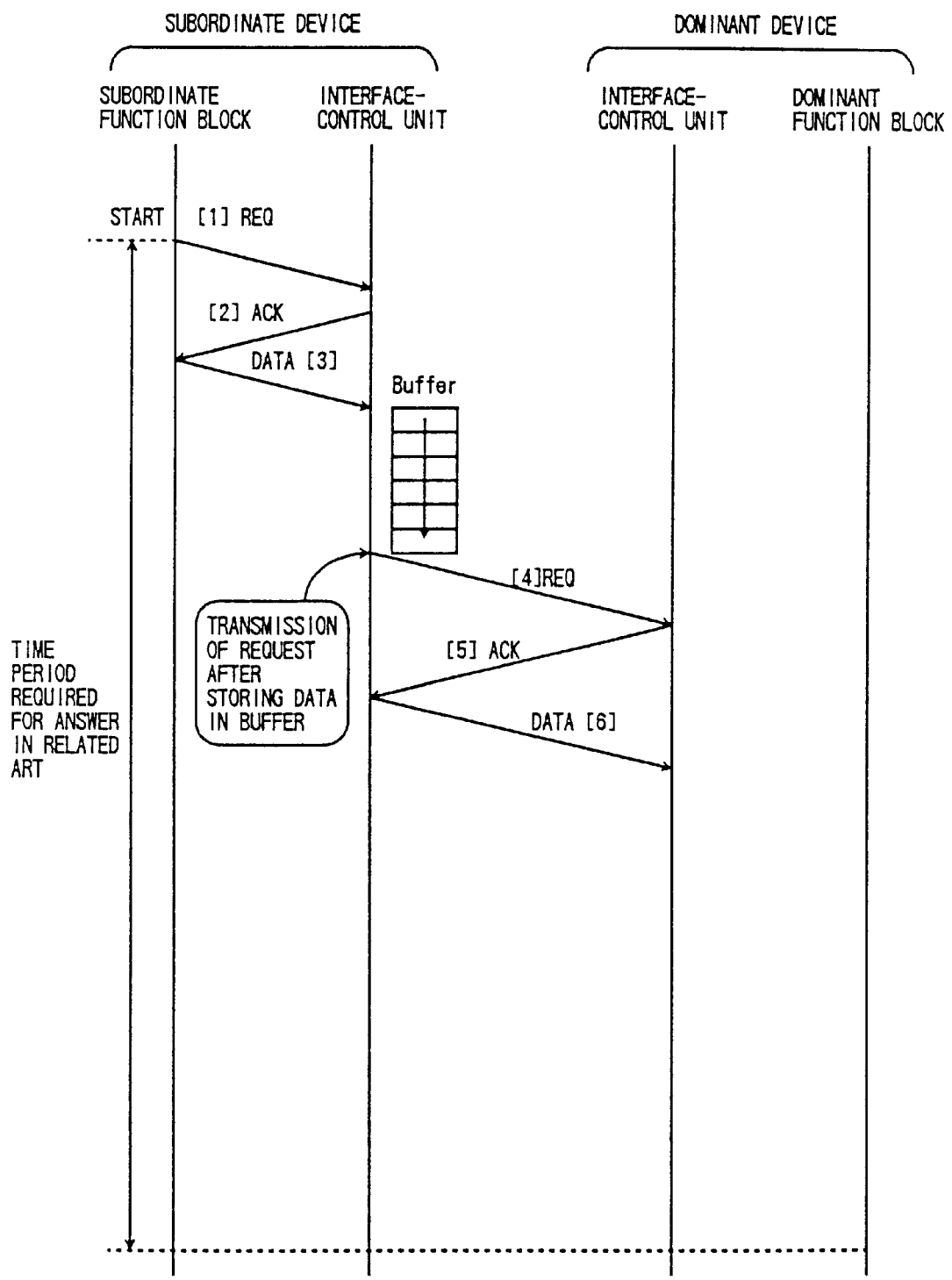
FIG. 4 is a sequence chart showing a portion of the sequence performed when the subordinate function block accesses the dominant function block.

FIG. 11 shows an example in which a switch device is extended. A subordinate function block is added as an extension in order to meet customer needs. More specifically, the bus extension device is added as a subordinate device. The main device includes a bus-extension-control unit 36, a processor 37, dominant function blocks 38 and 39, a main-bus-control/inter-system-control unit 40, and a main bus 64. In comparison with the configuration of FIG. 1, the processor 37 corresponds to the dominant function block 10, and the bus-extension-control unit 36 corresponds to the interface-control units 7 and 8. Further, the dominant function block 9 may be equated with the dominant function blocks 38 and 39 and the main-bus-control/inter-system-control unit 40.

The bus-extension device includes subordinate function blocks 31 through 34 and a subordinate-function-block-control unit 35. In comparison with the configuration of FIG. 1, the interface-control units 5 and 6 correspond to the subordinate-function-block-control unit 35, and the subordinate function blocks 1 through 4 correspond to the subordinate function blocks 31 through 34.

In the configuration shown in FIG. 11, the main device, which is a dominant device, has a dual structure, including a #0 system (ACT) and a #1 system (SBY). The following description will be provided with respect to a #0-system device.

The #0-system device includes the main device (dominant device), a cable, and the bus-extension device (subordinate device). In FIG. 11, the #0-system switch device is extended to include the subordinate function blocks 31 through 34 via the bus-extension-control unit 36 and the subordinate-function-block-control unit 35.

The present invention is applied to the subordinate-function-block-control unit 35 and the bus-extension-control unit 36.

FIG. 12 is a block diagram of the subordinate-function-block-control unit 35. FIG. 13 is a block diagram of the bus-extension-control unit 36.

The subordinate-function-block-control unit 35 of FIG. 12 includes a REQUEST-generation circuit 20, a bus handler 21, a DC-generation circuit 22, a WRITE-pulse-generation circuit 23, a FIFO buffer 24, a READ-pulse-generation circuit 25, an SBS/SBK-generation circuit 27, and a quartz oscillator 30.

The REQUEST-generation circuit 20 in principle serves as a transit point to transfer a REQUEST signal to the main device when the REQUEST signal is received from one of the subordinate function blocks 31 through 34. The REQUEST signal from the one of the subordinate function blocks 31 through 34 is negated, however, when data transfer from the one of the subordinate function blocks 31 through 34 to the FIFO buffer 24 of the subordinate-function-block-control unit 35 is completed. This results in a situation where the REQUEST signal forwarded to the bus-extension-control unit 36 of the main device is also negated, thereby severing communication between the units.

In order to obviate this problem, a REQUEST signal to the main device is generated by the REQUEST-generation circuit 20 by combining an EF signal of the FIFO buffer 24 and the REQUEST signal received from the one of the subordinate function blocks 31 through 34.

FIG. 14 is a timing chart for explaining generation of the REQUEST signal.

In FIG. 14, the EF signal is in an ASSERT state when the FIFO buffer 24 is empty, and is in a NEGATE state when data is stored in the FIFO buffer 24. Accordingly, the REQUEST signal output from the REQUEST-generation circuit 20 is in a NEGATE state when the FIFO buffer 24 has data stored therein.

The bus handler 21 receives the REQUEST signal from the one of the subordinate function blocks 31 through 34. Then, the bus handler 21 returns a signal ACK to the subordinate function block that sent the REQUEST signal if a check of the bus usage reveals that none of the subordinate function blocks 31 through 34 is currently using the bus. If the bus is currently in use, the bus handler 21 waits until the bus is free, and thereafter sends a signal ACK.

The DC-generation circuit 22 generates a DC (data complete) signal. The DC signal is used for informing a subordinate function block of a completion of data transfer that this subordinate function block has requested. The DC signal is generated by using an SBLK signal that is in an ASSERT state while data transfer is underway.

The WRITE-pulse-generation circuit 23 generates a WRITE-pulse signal that is used for writing data in the FIFO buffer 24 of the subordinate-function-block-control unit 35 when the data is received from one of the subordinate function blocks 31 through 34. The WRITE-pulse signal is generated based on the SBLK signal and a SBCLK signal (which is a clock signal used for data receipt and data transfer). FIG. 15 is a timing chart showing how to generate the WRITE-pulse signal.

The READ-pulse-generation circuit 25 generates a READ-pulse signal based on the EF signal of the FIFO buffer 24 and the signal ACK from the bus-extension-control unit 36 of the main device. When the signal ACK arrives from the bus-extension-control unit 36, the READ-pulse-generation circuit 25 generates the READ-pulse signal by using the signal ACK as a trigger. By this time, the data sent from the one of the subordinate function blocks 31 through 34 is stored in the FIFO buffer 24, so that the data is read from the FIFO buffer 24 to be transferred to the bus-extension-control unit 36.

The subordinate-function-block-control unit 35 includes the quartz oscillator 30. The quartz oscillator 30 generates a clock BCLK, which is used as a synchronization signal for transferring data to the bus-extension-control unit 36. The SBS/SBK-generation circuit 27 generates a SBS signal and the SBLK signal based on the clock BCLK, the signal ACK, the READ-pulse signal, and the data DATA. The SBS signal indicates a start of data transfer by maintaining an ASSERT state for one-clock cycle at the beginning of data transfer.

The FIFO buffer 24 stores the data sent from one of the subordinate function blocks 31 through 34. The data read from the FIFO buffer 24 is transmitted to the main device (bus-extension-control unit 36).

In what follows, operations of the subordinate-function-block-control unit 35 will be described.

1) The subordinate-function-block-control unit 35 receives the REQUEST signal from one of the subordinate function blocks 31 through 34. The received signal is supplied to the bus handler 21 and the REQUEST-generation circuit 20.

2) The bus handler 21 sends the signal ACK to the subordinate function block that sent the REQUEST signal.

3) The REQUEST-generation circuit 20 sends the REQUEST signal to the bus-extension-control unit 36 of the main device (dominant device).

4) The data DATA is transmitted from the one of the subordinate function blocks 31 through 34 to the subordinate-function-block-control unit 35 in synchronism with the clock SBCLK along with the signal SBLK after the one of the subordinate function blocks 31 through 34 receives the signal ACK from the bus handler 21.

5) The data DATA received from the one of the subordinate function blocks 31 through 34 is written in the FIFO buffer 24 in synchronism with the WRITE-pulse signal generated by the WRITE-pulse-generation circuit 23.

6) The subordinate-function-block-control unit 35 receives the signal ACK which is sent from the bus-extension-control unit 36 as a reply to the REQUEST signal.

7) The READ-pulse signal is generated in response to the received signal ACK so as to read the data DATA from the FIFO buffer 24.

8) The data DATA read from the FIFO buffer 24 is transferred to the basic device (bus-extension-control unit 36) along with the SBS signal, the SBLK signal, and the BCLK signal.

FIG. 13 is a block diagram of the bus-extension-control unit 36. FIG. 13 shows a portion relevant to the present invention. In the figure, elements having identical functions to those of FIG. 12 are referred to by the same numerals, and a description thereof will be omitted.

The bus-extension-control unit 36 basically has the same configuration as the subordinate-function-block-control unit 35 of FIG. 12. As an additional unit, however, the bus-extension-control unit 36 is provided with a UID-check circuit 26, which checks a destination of data transfer before the data transfer is started.

A UID (unit ID) is an identification that is uniquely assigned to each of the processor 37, the dominant function blocks 38 and 39, the bus-extension-control unit 36, the subordinate-function-block-control unit 35, the subordinate function blocks 31 through 34, etc. The UID is used as an indication of a destination of data transfer.

The UID-check circuit 26 checks a destination of data transfer by detecting a UID included in data that is received from the subordinate-function-block-control unit 35. For example, an address of the destination may be provided as a UID at the beginning of the data. If the check finds no error, the data is transferred to the main bus. If the UID is wrong, the data is not transferred.

In what follows, operations of the bus-extension-control unit 36 will be described.

1) The bus-extension-control unit 36 receives a REQUEST signal from subordinate-function-block-control unit 35. The received signal is supplied to the bus handler 21 and the REQUEST-generation circuit 20.

2) The bus handler 21 sends a signal ACK to the subordinate-function-block-control unit 35 that sent the REQUEST signal.

3) The REQUEST-generation circuit 20 sends a REQUEST signal to the dominant function blocks.

4) Data DATA is transmitted from the subordinate-function-block-control unit 35 to the bus-extension-control unit 36 in synchronism with the clock SBCLK along with the signal SBLK after the subordinate-function-block-control unit 35 receives the signal ACK from the bus handler 21.

5) The data DATA received from the subordinate-function-block-control unit 35 is written in the FIFO buffer 24 in synchronism with the WRITE-pulse signal generated by the WRITE-pulse-generation circuit 23.

6) The bus-extension-control unit 36 receives a signal ACK which is sent from an access device as a reply to the REQUEST signal. Here, the access device is one of the dominant function blocks that is supposed to receive an answer from the subordinate function blocks.

7) The READ-pulse signal is generated in response to the received signal ACK so as to read the data DATA from the FIFO buffer 24.

8) The data DATA is read from the FIFO buffer 24, and is sent to the basic bus after checking the UID thereof. The destination of data transfer is the access device that is supposed to receive an answer from the subordinate function blocks.

9) The data DATA is sent along with the SBS signal, the SBLK signal, and the BCLK signal.

In this embodiment, the present invention is applied to the subordinate-function-block-control unit 35 of FIG. 12 and the bus-extension-control unit 36 of FIG. 13.

As previously described, the switch device of the present invention has a dual structure in that the dominant device has the #0 system (ACT) and the #1 system (SBY). The control scheme of the present invention can also be applicable to communications between the #0 system and the #1 system. When the #1 system (SBY) accesses the #0 system (ACT), there is a need for bus arbitration in the same manner as in the inter-device communications. In this case, the #1 system (SBY) corresponds to a subordinate device, and the #0 system (ACT) corresponds to a dominant device.

This embodiment has been described with reference to an example of a switch-device system. It should be noted, however, that the present invention is not limited in its application to a switch-device system, but can be applicable a communication system in general. In particular, the present invention is suitable for communication between a dominant device and a subordinate device.

Further, the present invention is not even limited in its application to communication between a dominant device and a subordinate device. The present invention is applicable to communication between devices which are equal in terms of their control over the other.

Moreover, the embodiment has been described with regard to a case in which a plurality of dominant function blocks are connected to a plurality of subordinate function blocks via a bus. The present invention, however, is not limited to such a configuration, and can be applicable to communication between a single dominant function block and a single subordinate function block or communication between two function blocks which are equal in terms of their control statuses.

In the embodiment described above, the bus handler is provided for the subordinate-function-block-control unit and the bus-extension-control unit. Alternatively, the bus handler may be provided to other units rather than these two units.

Further, the present invention is not limited to these embodiments, but various variations and modifications may be made without departing from the scope of the present invention.

The present application is based on Japanese priority application No. 10-361617 filed on Dec. 18, 1998, with the Japanese Patent Office, the entire contents of which are hereby incorporated by reference.

What is claimed is:

1. A method of transferring data from a source device to a destination device via a source-control device connected to the source device and a destination-control device connected to the destination device, the source-control device being connected to the destination-control device, said method comprising the steps of:

transmitting a data-transfer-request signal from the source device to the source-control device;

transmitting a data-transfer-acknowledge signal from the source-control device to the source device in response to the data-transfer-request signal; and transmitting a data-transfer-request signal from the source-control device to the destination-control device concurrently with the transmission of the data-transfer-acknowledge signal.

2. The method as claimed in claim 1, further comprising the steps of:

storing data sent from the source device in a FIFO buffer of the source-control device; and starting transferring the data stored in the FIFO buffer to the destination-control device immediately after the source-control device receives a data-transfer-acknowledge signal from the destination-control device.

3. The method as claimed in claim 1, further comprising a step of conducting a bus arbitration for use of a bus between the source-control device and the destination-control device in response to the data-transfer-request signal sent from the source-control device to the destination-control device.

4. A method of transferring data from a source device to a destination device via a source-control device connected to the source device and a destination-control device connected to the destination device, the source-control device being connected to the destination-control device, said method comprising the steps of:

transmitting a data-transfer-request signal from the source-control device to the destination-control device;

transmitting a data-transfer-acknowledge signal from the destination-control device to the source-control device in response to the data-transfer-request signal; and transmitting a data-transfer-request signal from the destination-control device to the destination device concurrently with the transmission of the data-transfer-acknowledge signal.

5. The method as claimed in claim 4, further comprising the steps of:

storing data sent from the source-control device in a FIFO buffer of the destination-control device; and starting transferring the data stored in the FIFO buffer to the destination device immediately after the destination-control device receives a data-transfer-acknowledge signal from the destination device.

6. The method as claimed in claim 4, further comprising a step of conducting a bus arbitration for use of a bus between the destination-control device and the destination device in response to the data-transfer-request signal sent from the destination-control device to the destination device.

7. A device for controlling transfer of data sent from a data source to a data destination, comprising:

a unit which transmits a data-transfer-acknowledge signal to the data source in response to a data-transfer-request signal sent from the data source; and a unit which transmits a data-transfer-request signal to a destination-control device connected to the data destination concurrently with the transmission of the data-transfer-acknowledge signal.

8. The device as claimed in claim 7, further comprising:

a FIFO buffer which stores data sent from the data source; and a unit which starts transferring the data stored in said FIFO buffer to the destination-control device immediately after receiving a data-transfer-acknowledge signal from the destination-control device.

9. A device for controlling transfer of data sent from a data source to a data destination, comprising:

a unit which transmits a data-transfer-acknowledge signal to a source-control device connected to the data source in response to a data-transfer-request signal sent from the source-control device; and a unit which transmits a data-transfer-request signal to the data destination concurrently with the transmission of the data-transfer-acknowledge signal.

10. The device as claimed in claim 9, further comprising:

a FIFO buffer which stores data sent from the source-control device; and a unit which starts transferring the data stored in said FIFO buffer to the data destination immediately after receiving a data-transfer-acknowledge signal from the data destination.

11. The device as claimed in claim 9, further comprising an identification-check unit which identifies an identification included in data sent from the data source, the data being transferred to the data destination if the identification matches that of the data destination.

* * * * *